(12) United States Patent
Kok et al.

(10) Patent No.: US 6,632,080 B1
(45) Date of Patent: Oct. 14, 2003

(54) DEVICE FOR THE PRODUCTION OF DISPOSABLE LENSES

(75) Inventors: Ronaldus Joannes Cornelis Maria Kok, Eindhoven (NL); Bas Boudewijn Broekhuis, Eindhoven (NL)

(73) Assignee: O.T.B. Group B.V., Eindhoven (NL)

(*) Notice: Subject to any disclaimer, the term of this patent is extended or adjusted under 35 U.S.C. 154(b) by 0 days.

(21) Appl. No.: 09/959,757

(22) PCT Filed: May 8, 2000

(86) PCT No.: PCT/NL00/00296
§ 371 (c)(1),
(2), (4) Date: Nov. 6, 2001

(87) PCT Pub. No.: WO00/67993
PCT Pub. Date: Nov. 16, 2000

(30) Foreign Application Priority Data
May 7, 1999 (NL) ............................................. 1012002

(51) Int. Cl.[7] ............................................. B29D 11/00
(52) U.S. Cl. ........................ 425/346; 425/351; 425/404; 425/444; 425/453; 425/808
(58) Field of Search .................. 425/346, 351, 425/404, 444, 446, 453, 808, DIG. 201

(56) References Cited

U.S. PATENT DOCUMENTS 5,340,399 A * 8/1994 Uftring et al. ................ 118/59
6,042,754 A   3/2000 Yang et al.
6,514,436 B1 * 2/2003 Dobner ........................ 264/1.1

FOREIGN PATENT DOCUMENTS

| EP | 0 183 324 A2 | 6/1986 |
| EP | 0 686 491 A2 | 12/1995 |
| EP | 0 691 195 A2 | 1/1996 |
| GB | 2 235 406 A | 3/1991 |
| WO | WO 92/06833 | 4/1992 |
| WO | WO 99/15327 | 4/1999 |

* cited by examiner

*Primary Examiner*—James P. Mackey
*Assistant Examiner*—Donald Heckenberg
(74) *Attorney, Agent, or Firm*—Young & Thompson

(57) ABSTRACT

A device for producing disposable lenses providing a concave mold and a convex mold for each lens, filing the concave mold with liquid starting material for the lens, and positioning the convex mold so as to enclose the starting material includes a first carousel, a first station, which is arranged along the first carousel, for depositing the concave mold at a set position on the carousel, a second station for filling the deposited concave mold with starting material for a lens, a third station for depositing the convex mold so as to enclose the starting material, and a fourth station for removing the assembly having concave mold and convex mold with enclosed starting material the first carousel.

12 Claims, 4 Drawing Sheets

DEVICE FOR THE PRODUCTION OF DISPOSABLE LENSES

FIELD OF THE INVENTION

The invention relates to the field of producing disposable lenses. Disposable lenses of this type consist of a flexible material and are produced by casting between two mould halves. A mould with suitably shaped mould halves must be available for each lens of a defined strength.

BACKGROUND OF THE INVENTION

The known device which is used for that purpose comprises a large number of mould blocks, each of which is suitable for one pair of lenses. The mould blocks are conveyed along predetermined paths, past a number of processing stations. This known device is complicated and has a relatively low production rate.

SUMMARY OF THE INVENTION

The object of the invention is to provide a device which can be used to ensure a relatively high production rate and is less complicated and prone to faults.

This object is achieved by means of a device for producing disposable lenses by means of the steps of providing a concave mould and a convex mould for each lens, filling the concave mould with liquid starting material for the lens, and positioning the convex mould so as to enclose the said starting material, which device comprises a first carousel, a first station, which is arranged along the first carousel, for depositing the concave mould at a set position on the carousel, a second station for filling the deposited concave mould with starting material for a lens, a third station for depositing the convex mould so as to enclose the starting material, and a fourth station for removing the assembly comprising concave mould and convex mould with enclosed starting material from the first carousel.

In the device according to the invention, the moulds are situated on a carousel which provides a steady, smooth movement path.

The starting material for the lenses which has been deposited in the moulds is removed from this carousel by the fact that the fourth station for removing the assembly comprises an ejector member for moving the assembly off the carousel in the upward direction.

Furthermore, there is a second carousel, first transfer means for transferring each assembly from the first carousel to the second carousel, drying means, which are arranged along the second carousel, for drying the starting material, and means for removing each assembly from the second carousel. The drying means comprise a tunnel through which part of the circumference of the second carousel moves.

In connection with transferring the moulds and the starting material, the circumference of the second carousel partially extends above the circumference of the first carousel, in such a manner that at least one set position of the first carousel is aligned with respect to a set position on the second carousel, and an assembly can be transferred from one set position to the other set position by means of an ejector member.

Each set position on the second carousel contains a through-opening and a bearing member which is situated above this opening, which bearing member comprises at least two bearing halves which can be moved towards and away from one another, in such a manner that when the ejector member is moved upwards through the said opening the bearing halves are moved away from one another, and before the ejector member is moved downwards the bearing halves are moved towards one another in order to take an assembly off the ejector member.

Also, second transfer means are provided for transferring each assembly from the second carousel to a fifth station, which fifth station comprises removal means for removing the convex mould.

In connection with removing the lenses from the moulds, there is a third carousel and third transfer means for transferring an assembly comprising a concave mould and the starting material which has solidified in the drying means from the fifth station to the third carousel.

Means for loosening the solidified starting material with respect to the concave mould are situated along the third carousel; in particular, dropper means are provided for feeding demineralized water to the assembly comprising the solidified starting material and the concave mould.

Each carousel is provided with suction means for removing a mould.

BRIEF DESCRIPTION OF THE DRAWINGS

The invention will be explained in more detail with reference to an exemplary embodiment which is illustrated in the figures, in which.

DETAILED DESCRIPTION

Figure 1:
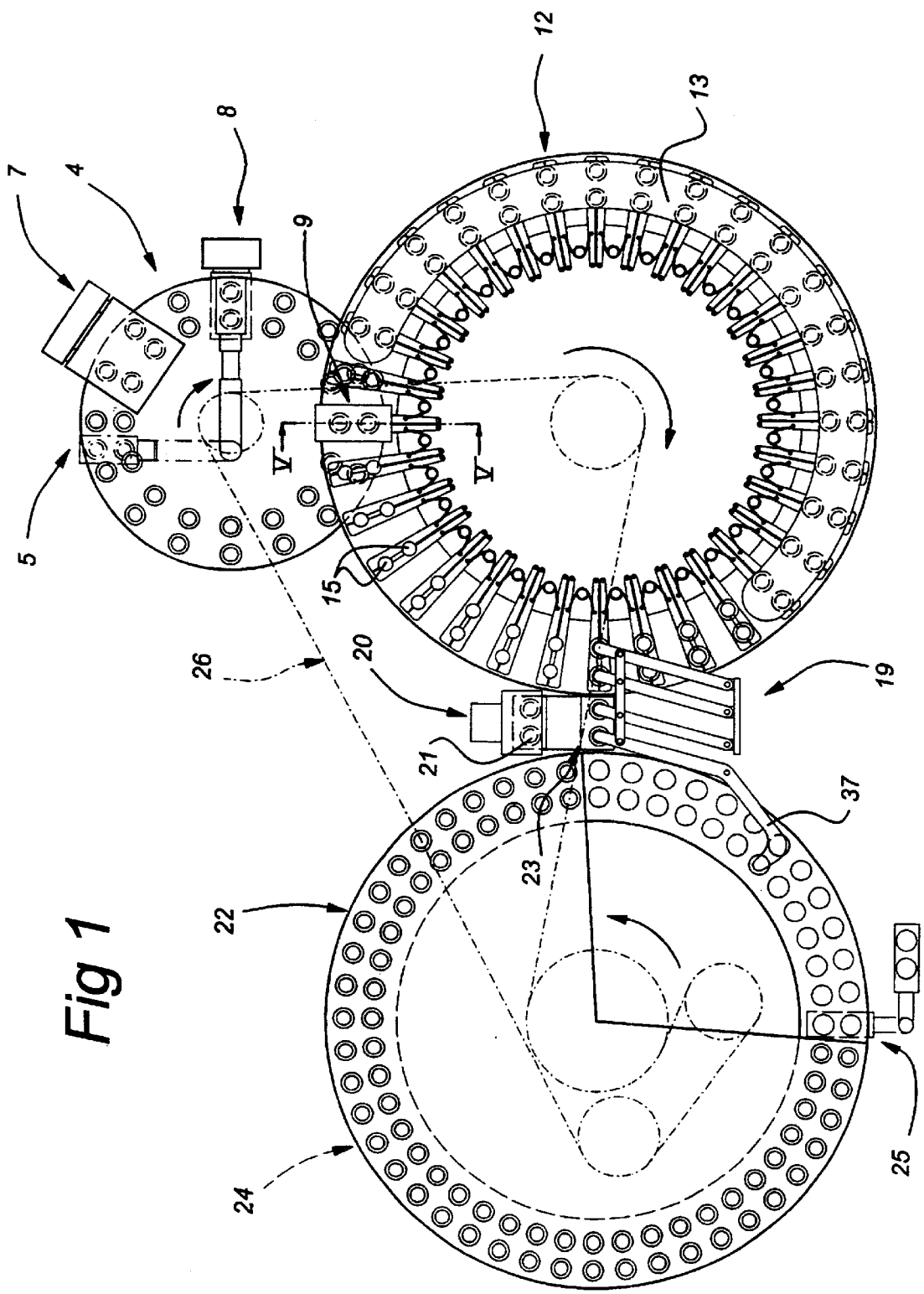
FIG. 1 shows a plan view of the device according to the invention.
Figure 2:
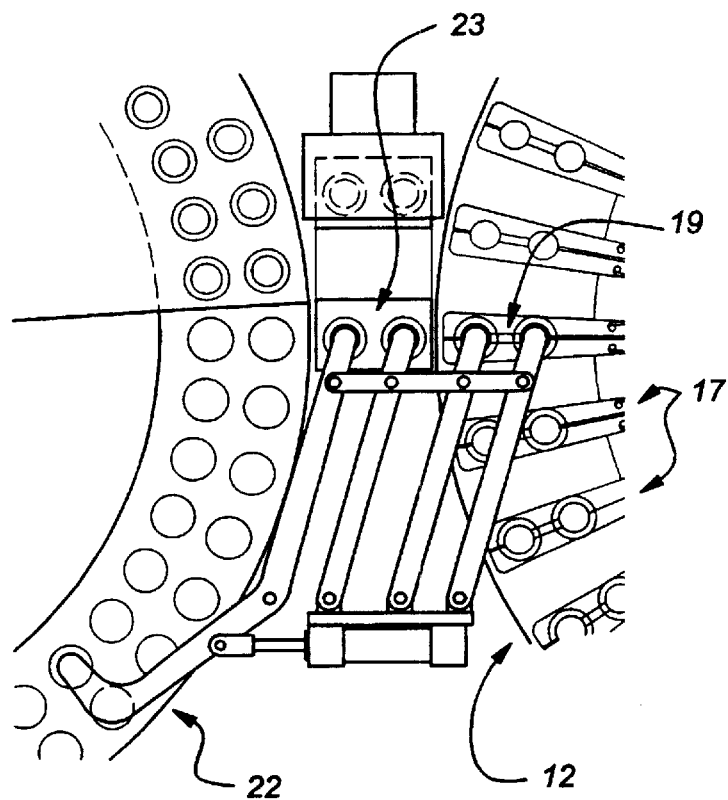
FIGS. 2 and 3 show details of the transfer means between the second and third carousels.
Figure 3:
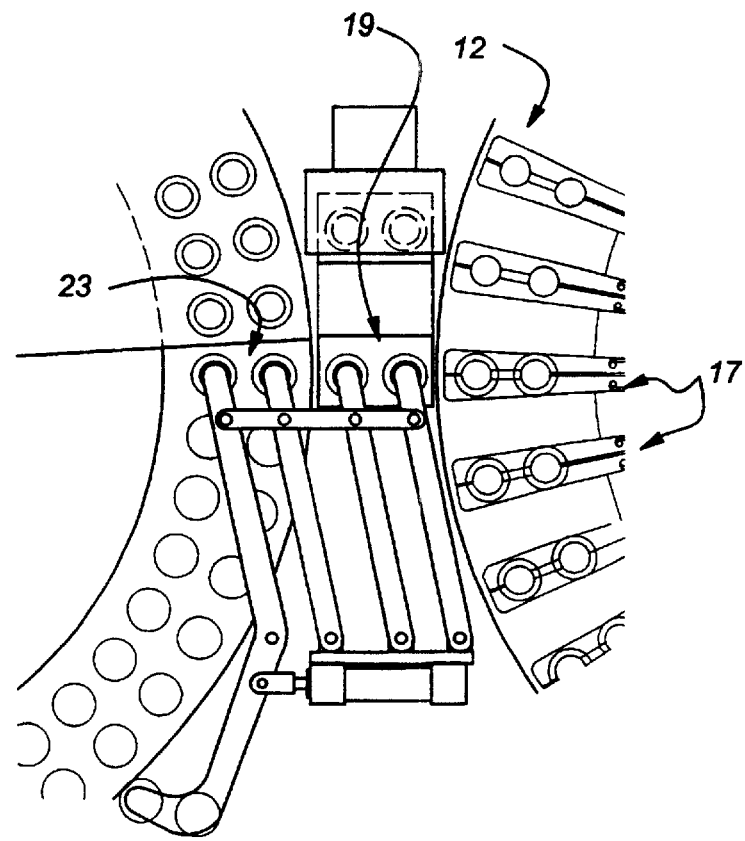
Figure 6A:
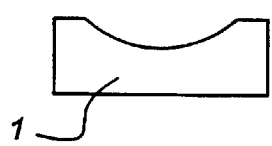
FIGS. 6a–6j show the various production stages of the concave moulds with starting material and finished lens.
Figure 6B:
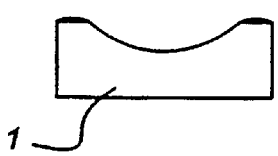
Figure 6C:
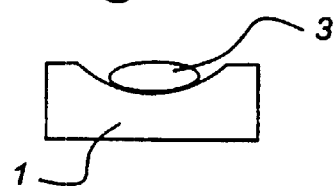

The device according to the invention which is illustrated in FIG. 1 comprises a first carousel 4, which defines a first station 5 where a concave mould 1 (cf. also FIG. 6) is placed in the cavities 27 which are present in the carousel 4. In the figures, the carousel 4 rotates to the right, as indicated by the arrow, in such a manner that the cavities 27 which have been provided with the concave mould 1 reach the second station 7. At that station, a quantity of liquid starting material is placed in the concave mould, as also illustrated in FIG. 6c.

Figure 6D:
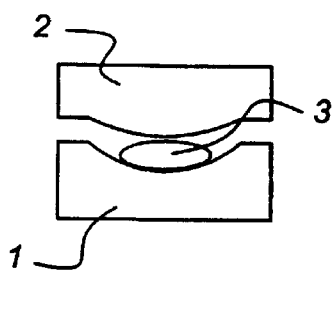
Figure 6E:
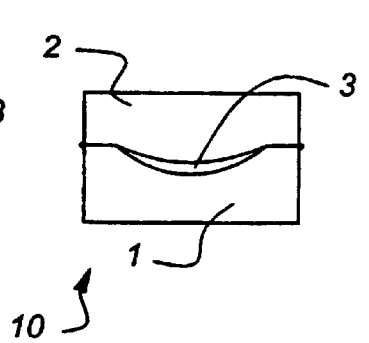
Figure 6F:
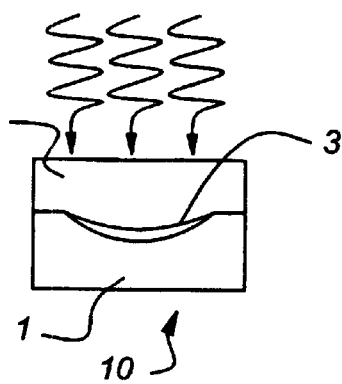
Figure 6G:
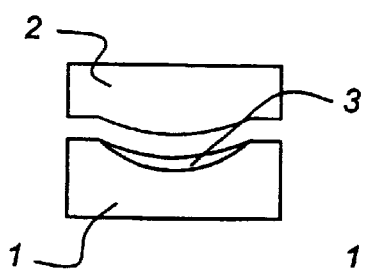
Figure 6H:
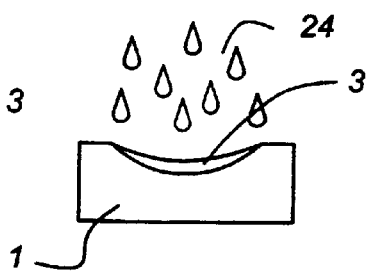
Figure 6I:
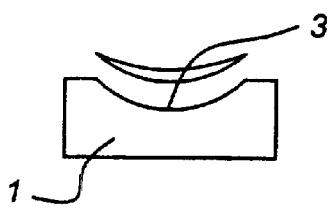
Figure 6J:
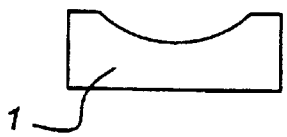

In the following third station 8, the convex mould 2 is placed onto the concave mould 1 into which the starting material 3 has been placed, as also illustrated in FIGS. 6d, 6e.

Figure 5:
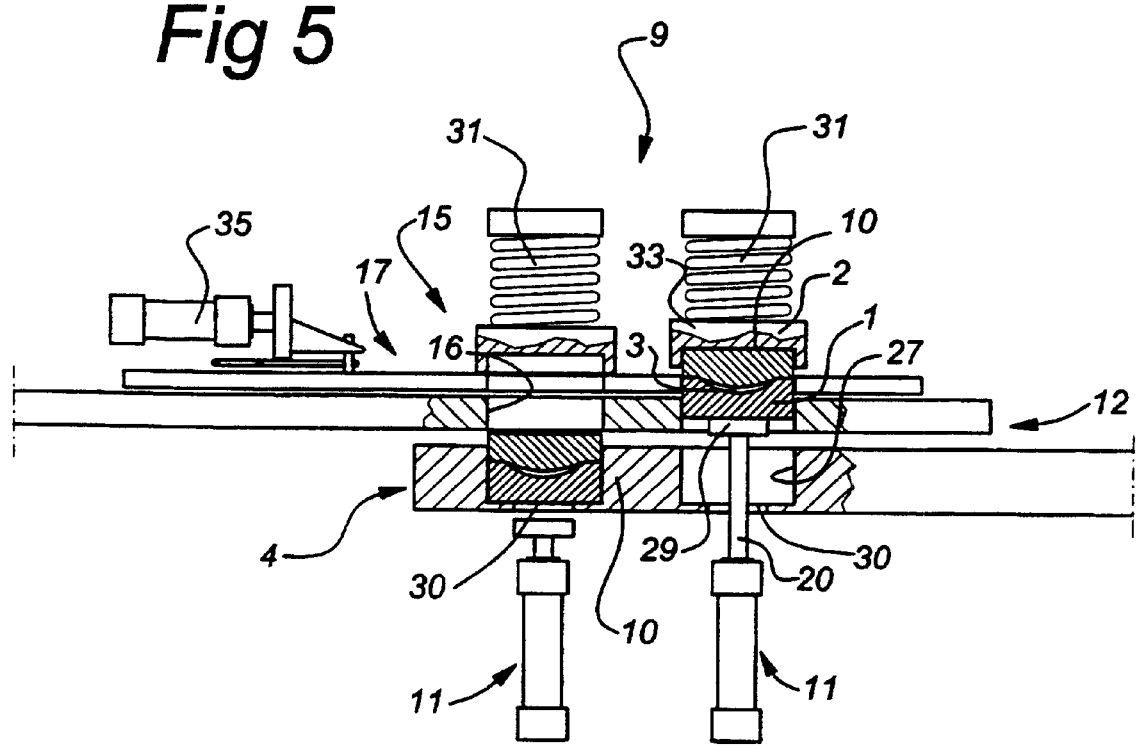
FIG. 5 shows a cross section on V—V from FIG. 1.

The assembly 10 which is formed in this way is then removed from the recesses 27 at the location of the fourth station 9, as illustrated in cross section in FIG. 5.

For this purpose, two ejector members 11 are provided at the station 9, each positioned beneath a recess 27. The ejector member, for example a pneumatic piston/cylinder device, has a piston rod 28 with an ejector head 29 which can be moved into the recess 27 via the cavity 30 which opens out on the bottom side of the first carousel.

As illustrated in FIG. 5, the assembly 10 is pushed upwards by means of this ejector member 11, this assembly 10 passing into a recess 16 in the second carousel 12.

At the location of the fourth station 9 there are two pressure-exerting members 31, provided, for example, with pneumatic piston/cylinder devices as well. These pressure-exerting members 31 have a coil spring 32 with, at its free end, an indentation 33 into which the convex mould fits. By means of the combined pressure exerted by the ejector member 11 and the pressure-exerting member 31, the concave and convex moulds 1, 2 are pressed firmly onto one another.

Figure 4:
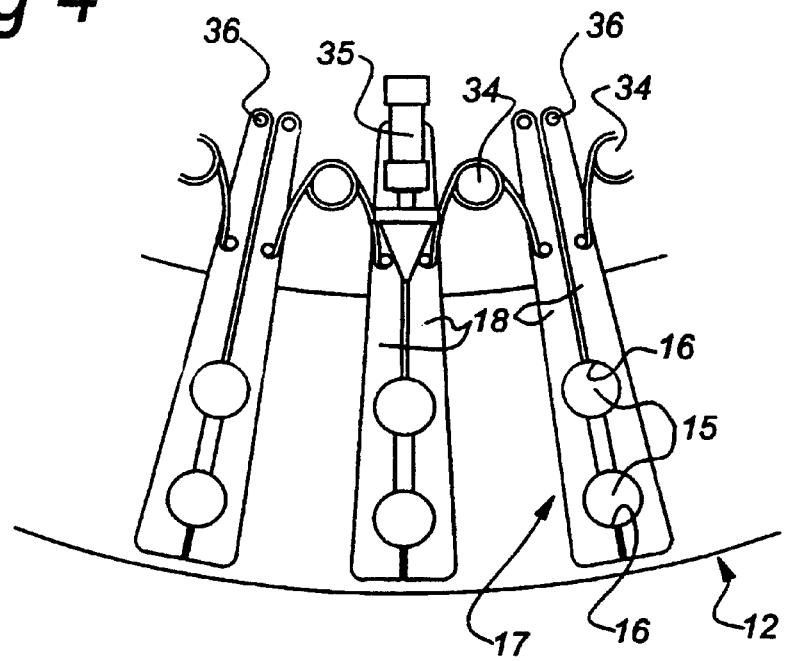
FIG. 4 shows a detail of the second carousel.

In the recess 16 in the second carousel 12, the concave moulds 1 of each assembly 10 are held securely by means of the bearing members 17, which each comprise two bearing halves 18 which can be moved towards one another and away from one another. In the position illustrated in FIGS. 4 and 5, these bearing halves 18 are pressed firmly together under the influence of the springs 34.

With a view to positioning an assembly 10 in the bearing members 17 or releasing it therefrom, a pneumatic piston/cylinder device 35 is provided, which actuates in each case one pair of bearing halves 18 by pressing them into the open position, counter to the action of the pressure-exerting springs 34. In the process, the bearing halves 18 pivot about the pivot points 36.

The second carousel 12 likewise rotates to the right, as indicated by the arrow 7, in such a manner that the assemblies 10 including starting material pass into the drying device 13. At the end of this drying device 13, the starting material 3 has solidified. The assemblies 10 can then be transferred, by means of the second transfer means 19, to a fifth station 20 where removal means 21 are provided for removing the top, convex moulds 2.

An assembly comprising a concave mould 1 and the solidified starting material 3 is transferred to the third carousel 22 by means of the third transfer means 23, which are coupled to the second transfer means 19.

Along this third carousel 24 there are dropper means 24 for supplying demineralized water to the solidified starting material 3 in order to detach it from the concave mould 1.

Finally, at the fourth removal means 25 the solidified starting material 3 is removed from the concave mould 2, and also the concave moulds 2 themselves are removed by means of the arm 37 which is coupled to the second and third transfer means 19, 23.

FIGS. 6a–6j illustrate the various steps to which the moulds 1, 2 are subjected during the production method described above.

What is claimed is:

1. Device for producing disposable lenses by means of the steps of providing a concave mould (1) and a convex mould (2) for each lens, filling the concave mould (1) with liquid starting material (3) for the lens, and positioning the convex mould (2) so as to enclose the said starting material (3), which device comprises a first carousel (4), a first station (5), which is arranged along the first carousel (4), for depositing the concave mould (1) at a set position (6) on the carousel, a second station (7) for filling the deposited concave mould (1) with starting material (3) for a lens, a third station (8) for depositing the convex mould (2) so as to enclose the starting material (3), and a fourth station (9) for removing the assembly (10) comprising concave mould (1) and convex mould (2) with enclosed starting material (3) from the first carousel (4), characterized in that there is a second carousel (12), first transfer means (11) for transferring each assembly (10) from the first carousel (4) to the second carousel (12), drying means (13), which are arranged along the second carousel (12), for drying the starting material (3), and means (19) for removing each assembly (10) from the second carousel (12).

2. Device according to claim 1, in which the fourth station (9) for removing the assembly (10) comprises an ejector member (11) for moving the assembly (10) off the carousel (4) in the upward direction.

3. Device according to claim 1, in which the drying means (13) comprise a tunnel through which part of the circumference of the second carousel (12) moves.

4. Device according to claim 1, in which the circumference of the second carousel (12) partially extends above the circumference of the first carousel (4), in such a manner that at least one set position (6) of the first carousel (4) is aligned with respect to a set position (15) on the second carousel (12), and an assembly (10) can be transferred from one set position (16) to the other set position (15) by means of an ejector member.

5. Device according to claim 4, in which each set position (15) on the second carousel (12) contains a through-opening (16) and a bearing member (17) which is situated above this opening, which bearing member (17) comprises at least two bearing halves (18) which can be moved towards and away from one another, in such a manner that when the ejector member (11) is moved upwards through the said opening (16) the bearing halves (18) are moved away from one another, and before the ejector member (11) is moved downwards the bearing halves (18) are moved towards one another in order to take an assembly (10) off the ejector member (11).

6. Device according to claim 1, in which second transfer means (19) are provided for transferring each assembly (10) from the second carousel (12) to a fifth station (20), which fifth station (20) comprises removal means (21) for removing the convex mould (2).

7. Device according to claim 6, in which there is a third carousel (22) and third transfer means (23) for transferring an assembly comprising a concave mould (1) and the starting material (3) which has solidified in the drying means (13) from the fifth station (20) to the third carousel (22).

8. Device according to claim 7, in which means (24) for loosening the solidified starting material (3) with respect to the concave mould (1) are situated along the third carousel (22).

9. Device according to claim 8, in which dropper means (24) are provided for feeding demineralized water to the assembly comprising the solidified starting material (3) and the concave mould (1).

10. Device according to claim 9, in which there are fourth removal means (25) for removing the product of solidified starting material (3) from the concave mould (1), and means for removing the concave mould.

11. Device according to claim 1, in which each carousel (4, 13, 22) is provided with suction means for removing a mould.

12. Device according to claim 1, in which each carousel (4, 13, 22) can be driven by means of a common belt/pulley or chain/sprocket drive (26).

* * * * *